Figure 1:
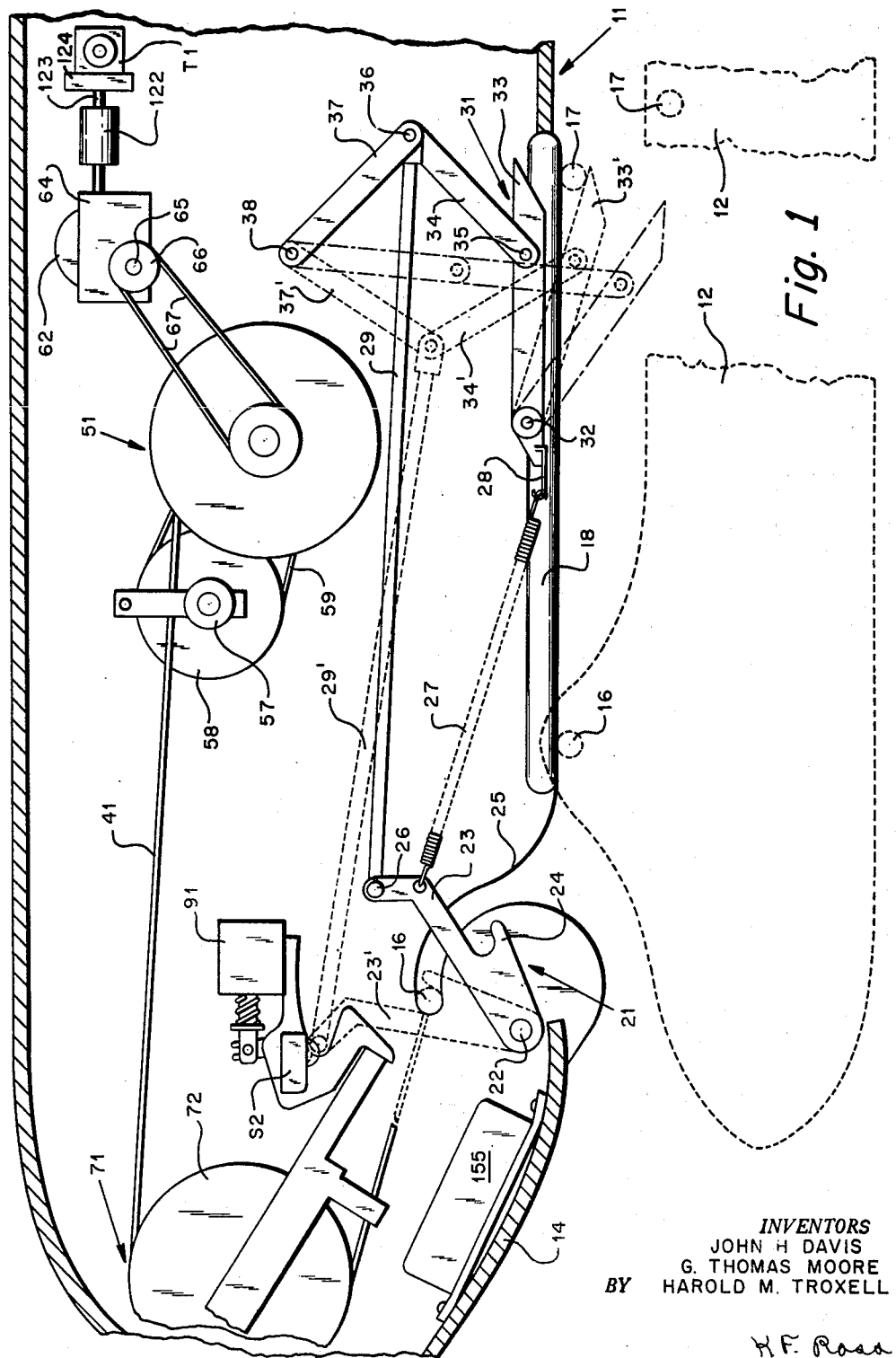

INVENTORS
JOHN H DAVIS
G. THOMAS MOORE
BY HAROLD M. TROXELL

H.F. Rosa
ATTORNEYS

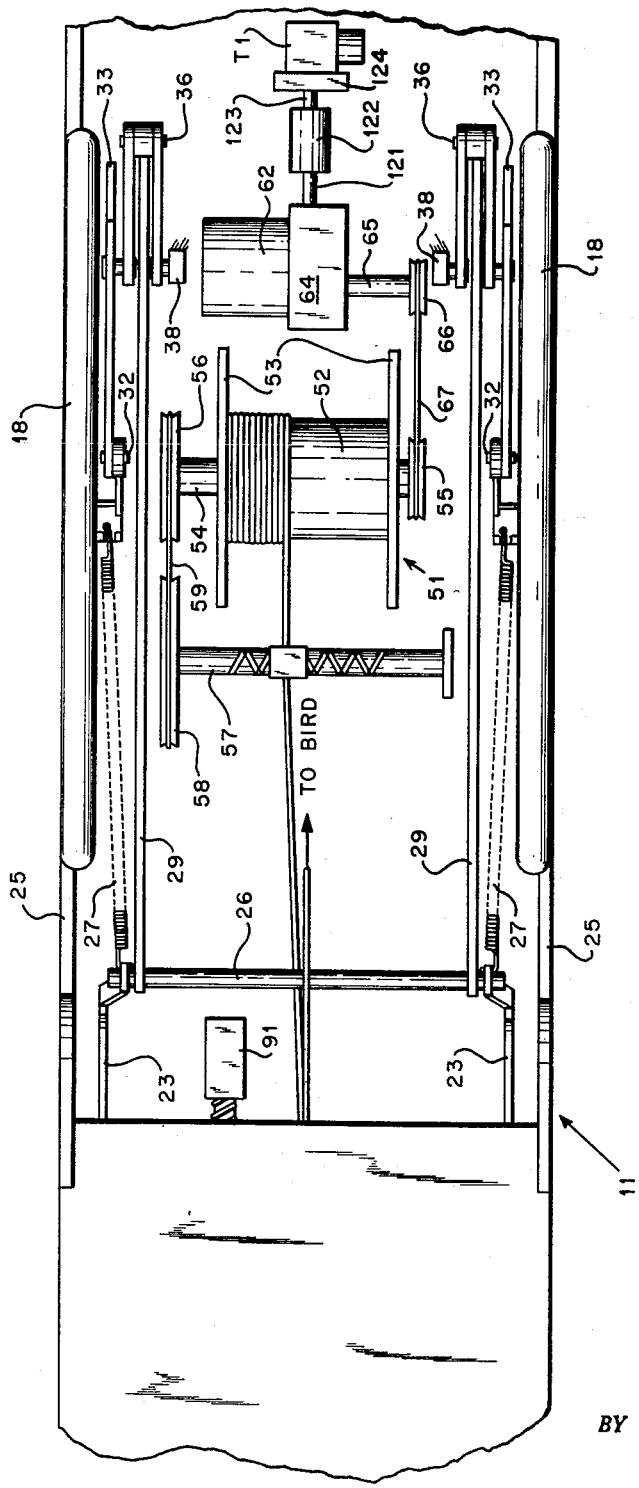

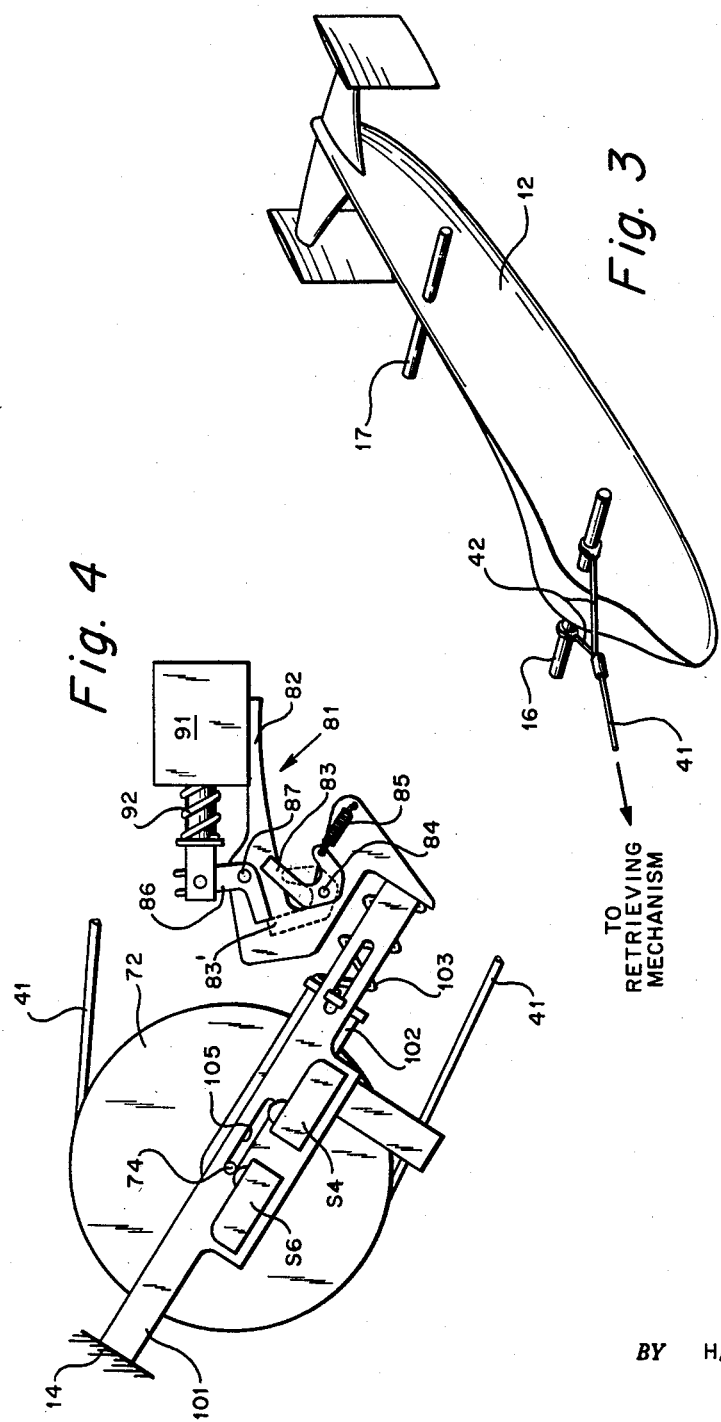

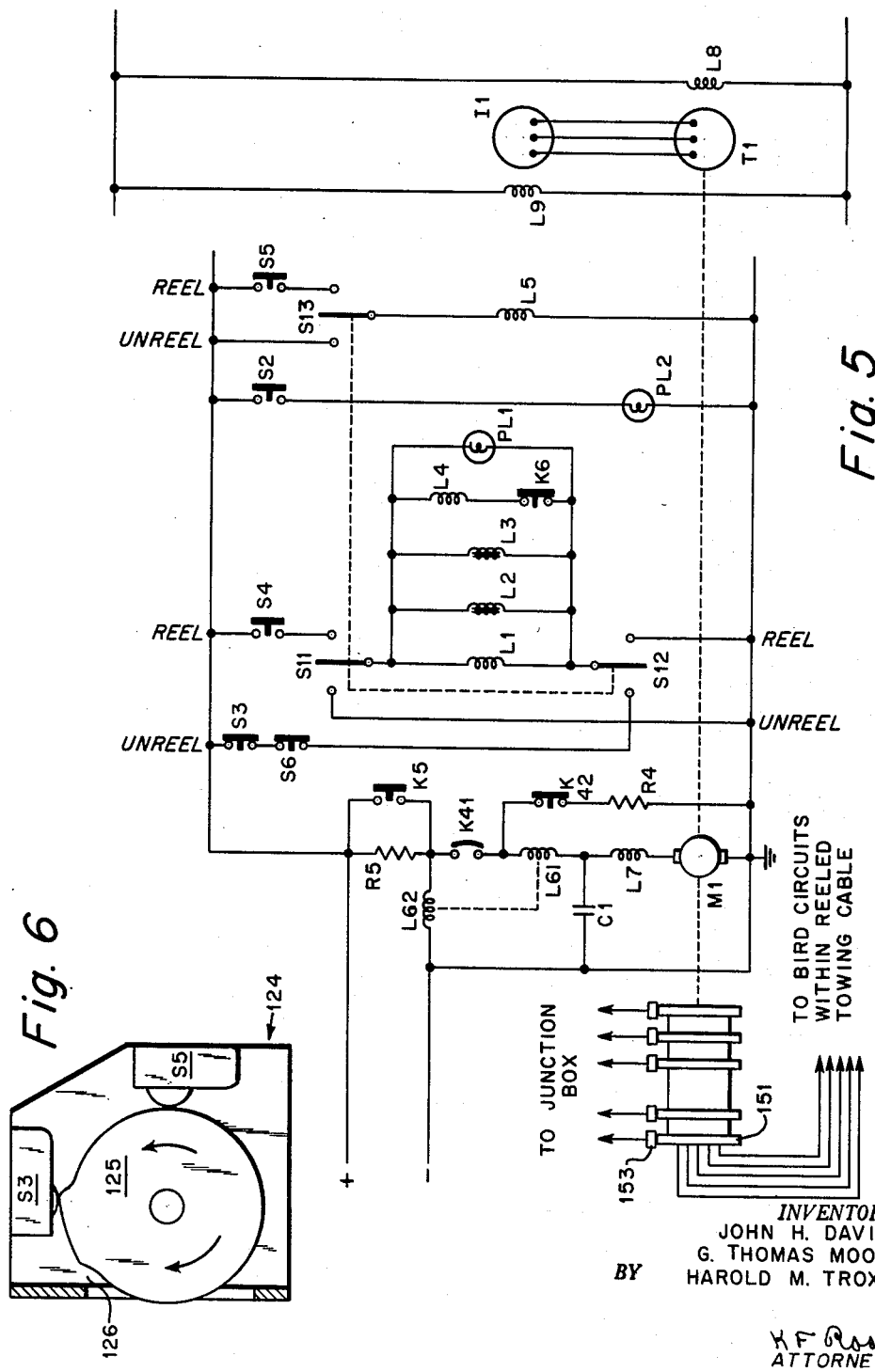

United States Patent Office 2,848,179
Patented Aug. 19, 1958

2,848,179

AUTOMATIC RETRIEVING MECHANISM FOR NOSE TOWED BIRD

Harold Maskill Troxell, Burlington, N. J., and G. Thomas Moore, Huntingdon Valley, and John H. Davis, Hatboro, Pa.

Application June 11, 1954, Serial No. 436,261

17 Claims. (Cl. 244—3)

(Granted under Title 35, U. S. Code (1952), sec. 266)

The invention described herein may be manufactured and used by or for the Government of the United States of America for governmental purposes without the payment of any royalties thereon or therefor.

This invention relates to an automatic launching, towing, and retrieving mechanism for a nose-towed capsule and more particularly to an automatic launching, towing, and retrieving mechanism for a nose-towed capsule or "bird" including suitable automatic remotely controlled latch assemblies and a coordinated remotely controlled cable reel selectively operable to retain a capsule in a fixed stowed position or to stream said capsule at a distance from a towing aircraft by means of a length of towing cable, and to make the transitions between these conditions.

The equipment previously used to perform this function included a relatively large and complex framework mounted permanently externally of an aircraft with numerous coordinated moving elements actuated by a hydraulic actuating system and fitted with a shock actuated cable cutter for emergency release of an extended length of cable and the capsule attached to the end thereof. In addition, this device included an electrically operated winch assembly mounted within the aircraft to selectively feed out and retrieve the towing cable as desired. This device had numerous disadvantages including its relatively large size, the extensive work required to install it permanently in an aircraft, the use of both electrical and hydraulic power to operate this equipment, and the complex interlocking circuitry characteristic of this equipment. In addition, because of the nature of the installation and the complexity of the various components included therein it was not readily removable once it had been installed in an aircraft. Finally, this complex equipment required two operators both of whom needed extensive training in order to qualify.

The present invention contemplates a compact unitary mechanism enclosed within a faired protective housing for readily releasable attachment externally of an aircraft by means of a conventional bomb shackle assembly, said mechanism being selectively operable to retain a capsule in a stowed position in fixed engagement with the housing of said mechanism and alternately to stream the capsule at the end of a substantial length of towing cable. In addition, said mechanism includes remotely controlled automatic means for making the transition between the stowed position of a capsule and the extended position of a capsule as necessary. Finally, the device characterizing the instant invention is so arranged that it may be operated readily by a single operator with relatively limited training.

One type of nose-towed capsule suitable for use with the present invention is disclosed and described in detail in the co-pending patent application Serial No. 403,946, now United States Patent No. 2,779,553, issued January 29, 1957.

An object of the present invention is the provision of means for selectively controlling the position of a capsule to be towed at the end of a length of cable by an aircraft.

Another object is to provide compact auxiliary equipment for attachment to an aircraft arranged to support a towed capsule in both a stowed and an extended position.

A further object of the invention is the provision of remotely controlled automatic means for releasing a nose-towed capsule from a stowed position in fixed relation to a towing aircraft and for unreeling a predetermined length of the towing cable to which a capsule is attached, and alternately operable to reel in the extended length of towing cable to which a capsule is attached and to fixedly secure the capsule in a stowed position.

The exact nature of this invention as well as other objects and advantages thereof will be readily apparent from consideration of the following specification relating to the annexed drawings in which:

Fig. 1 shows a longitudinally sectioned side elevation, partially broken away, of a preferred embodiment of the present invention, Fig. 2 shows a bottom plan view, partially broken away, of the embodiment shown in Fig. 1, Fig. 3 is a perspective view of one type of nose-towed capsule suitable for use with the present invention, Fig. 4 is an enlarged partial side elevation showing certain details of a portion of the mechanism shown generally in Fig. 1, Fig. 5 illustrates a schematic representation of the electrical circuit and the associated mechanical elements by means of which automatic operation of the instant invention is remotely controlled, and Fig. 6 is a simplified schematic showing of a cam assembly arranged to regulate the energization of certain portions of the circuit shown in Fig. 5.

Referring now to the drawings, wherein like reference characters designate like or corresponding parts throughout the several views, there is shown in Fig. 1, which illustrates a preferred embodiment, an automatically operable launching, towing, and retrieving mechanism generally designated by the reference numeral 11 and arranged to cooperate with a nose-towed capsule of the general type shown in Fig. 3 and also represented by a partially broken away phantom outline included in Fig. 1 and designated by the reference numeral 12. Said mechanism may be supported by and enclosed within the faired housing 14 either including or mounted upon an elongated supporting frame arranged to support the various components of said mechanism in operative relationship to each other. In addition, the housing 14 is arranged to protect the mechanism when it is removably mounted externally of an aircraft. In preparing the showing in Figs. 1 and 2 and the description below, the elongated supporting frame was considered to be integral with housing 14 in order to avoid confusing complexity of detail features in the figures and to simplify the description. However, the elongated supporting frame may alternatively comprise a welded tubular structure, for example, enclosed by a sheet metal housing attached thereto.

For cooperation with the present invention, the capsule 12 is provided with a longitudinally spaced pair of fixed elongated transversely extending attachment means 16 and 17, respectively, the opposite ends of which project beyond the opposite sides of the capsule. For best results, the forward attachment means 16 may be mounted upon an upwardly projecting supporting structure which may be enclosed in a suitable faired portion of the capsule as shown in Figs. 1 and 3. The capsule is secured in the stowed position by means of a pair of coordinated latch assemblies 21 and 31 included in the mechanism 11 and arranged to engage the attachment means 16 and 17, respectively, to retain the capsule 12 in a fixed position adjacent the longitudinally extending rails 18 located along the lower edges of the housing 14.

The latch assembly 21 includes a transversely extending shaft 22 rotatably mounted within the housing 14, a matched pair of lever arms 23 fixedly secured in radial alignment adjacent opposite ends of shaft 22, a radially projecting finger 24 formed integrally with each of said lever arms 23 and spaced angularly from the elongated main portion of each lever arm to form a generally circular notch intermediate the ends of the lever arm, a pair of arcuate camming surfaces 25 comprising the forward capsule engaging means which may be provided by cutting a suitable arcuate slot in each side wall of the housing 14 or by mounting a pair of arcuately slotted plates on opposite sides of the elongated supporting frame when it is fabricated separately from the housing, an elongated bar 26 disposed parallel to the shaft 22 and arranged to rigidly interconnect the ends of the respective lever arms 23 remote from the shaft 22, and a pair of tension springs 27 each connected at one end to one of the lever arms 23 and at the other end to a fixed supporting bracket 28 fixedly secured within the housing 14 at a position relatively remote from the latch assembly 21. In addition, latch assembly 21 is provided with a pair of elongated control links 29 each pivotally connected at one end to the bar 26 and pivotally connected at the opposite end to the latch assembly 31.

The latch assembly 31 includes a pair of laterally spaced pivotal supports 32 disposed in axial alignment on an axis extending transversely of housing 14, a pair of elongated lever arms 33 comprising the rearward capsule engaging means pivotally mounted at one end upon the respective supporting pivots 32, a first pair of elongated link members 34 each connected at one end to a pivot 35 disposed intermediate the ends of one of the arms 33 and connected at the opposite end by means of a pivot 36 to one end of one of a second pair of elongated link members 37, and a pair of laterally spaced supporting pivots 38 attached to opposite sides of the housing 14 and disposed in axial alignment on a pivotal axis extending transversely of the housing 14 to which the opposite ends of the respective link members 37 are pivotally connected. In addition, the respective pivots 36 are also pivotally connected to the rearward ends of the respective control links 29 to establish a positive connection between the respective control links and the latch assembly 31 for operation in the manner described in detail below. The two latch assemblies described above cooperate in their closed positions to secure a nose-towed capsule in its stowed position in fixed relation to the housing 14.

The means for securing a capsule to the device comprising the instant invention consists of a towing cable 41 preferably attached to the capsule 12 by a suitable bridle arrangement 42 connected to the projecting portions of attachment means 16 on opposite sides of and above the body of the capsule 12. The towing cable 41 is adjustably supported within the housing 14 by means of an automatically operable winch mechanism generally designated by the reference numeral 51 and a cable supporting assembly generally designated by reference numeral 71. The winch mechanism 51 includes a towing cable reel comprising a drum 52 fitted with circular end plates 53 and rotatably supported within the housing 14 by means of the shaft 54. Shaft 54 is fitted at one end with a pulley 55 and at the other end with a pulley 56. A conventional level winding mechanism 57 is mounted within the housing 14 adjacent to the reel in the manner shown in Figs. 1 and 2. A pulley 58 secured to one end of the level winding mechanism 57 is disposed in co-planar alignment with the pulley 56 and is operatively connected thereto by means of a belt 59. The power necessary for operating the winch mechanism is supplied by an actuator motor assembly 62 preferably of the direct current type with a shunt field winding adaptable to rotation in either direction by reversal of the current flow in the shunt field winding. The motor assembly is preferably arranged to transmit power through a magnetic clutch designed to slip under impact loading conditions and contained in the housing 64 which may also enclose a suitable gear train to provide the desired speed reduction for rotation of the winch mechanism at the desired rate. In addition, a brake assembly may be combined with the clutch so that it is released as the clutch is engaged and applied when the clutch is disengaged. The output shaft 65 projecting from the housing 64 is arranged to be driven by the motor assembly 62 through the gear train and the clutch within the housing 64 and is fitted with the pulley 66 fixedly secured thereto and disposed in co-planar alignment with the pulley 55 mounted upon shaft 54. The pulleys 66 and 55 are operatively interconnected by a belt 67 to transmit the power from the motor assembly 62 to the shaft 54 and thence through pulleys 56 and 58 to the level winding mechanism 57. The cable supporting assembly 71 includes a relatively large pulley wheel 72 rotatably mounted by means of shaft 74 upon a spring biased slidably mounted sheave 102 shown best in Fig. 4. The ends of the shaft 74 project through sheave 102 and into engagement with the elongated slots 105 in the elongated support 101.

In order to provide for fully automatic operation and positive control of the launching, towing, and retrieving mechanism 11 at all times and during all phases of operation it was necessary to provide various control and sensing means disposed in operative relationship to the various mechanical elements of this mechanism and operatively connected to a suitable control circuit such as the preferred embodiment thereof shown schematically in Fig. 5. For example, the latch assembly 21 and the coordinated latch assembly 31 are biased into one extreme position, in which the latch assembly 21 is open, by the tension springs 27. In order to retain the lever arms 23 of latch assembly 21 in the fully closed position shown in dotted lines in Fig. 1 it was necessary to provide the locking assembly, shown best in Fig. 4, generally designated by the reference numeral 81 and including the supporting element 82 and the lock 83 rotatably mounted upon the supporting element 82 by means of pivot 84 and biased toward its open position shown in full lines in Fig. 4 by a biasing spring 85. When the lever arms 23 are biased into their fully closed position, identified in Fig. 1 by the reference numeral 23', they force the lock 83 into the position shown in dotted lines in Fig. 4 and identified therein by the reference numeral 83'. The lock 83 is retained in this locked position by a bell crank lever 86 rotatably mounted upon the supporting element 82 by pivot 87. One arm of the bell crank lever 86 is operatively connected to the armature of the solenoid assembly 91 by some suitable means such as a pin and slot connection, and the other arm acts as a catch for engaging and restraining lock 83. Since the solenoid assembly 91 is fixedly secured to the supporting element 82, its compression spring 92 is normally effective to continuously bias the bell crank lever 86 in a counter-clockwise direction about the pivot 87 also fixedly secured to the supporting element 82. Hence, the lock 83 can only be released from its fully locked position by energization of the solenoid assembly 91 to overpower the spring 92 and produce clockwise rotation of the bell crank lever 86 out of engagement with the lock 83. In addition, the supporting element 82 may be fitted with a sensing means 82, such as a device known commercially as a "Micro-switch" or the like, disposed to engage the bar 26 and thereby sense the presence of the lever arms 23 in their fully locked position and their departure from this position. Referring again to Fig. 4, it will be noted that the locking assembly generally designated by the reference numeral 81 is fixedly secured to the lower end of the elongated support 101 attached at its upper end to the forward end of the housing 14 and arranged to provide a suitable mount for the cable supporting assembly generally designated by the reference numeral 71. The cable supporting assembly includes a sheave member 102 slidably mounted for movement longitudinally of the support 101 and continuously biased in one direction by the compression spring 103. As noted briefly above, the cable supporting pulley wheel 72 is in turn rotatably mounted upon the sheave 102 by means of a shaft 74 which may be arranged to project through elongated slots 105 in the support 101 to limit the sliding movement of the sheave 102 and to engage sensing means S4 and S6, which may comprise commercially available components such as "Micro-switches" or the like, attached to the support 101 and disposed at the opposite ends of one of the slots 105, as shown best in Fig. 4. The purpose of these latter sensing means and the manner in which they perform their prescribed functions will be described in detail below.

Two additional sensing means S3 and S5, such as "Micro-switches" or the like, are arranged as indicated schematically in Fig. 6 to be actuated by mechanical means operatively connected to the actuator motor assembly 62 through the gear train within the housing 64. These sensing means are incorporated in the control circuit as shown in the schematic representation thereof illustrated in Fig. 5 to regulate or limit operation of the motor assembly 62 in the manner and for the purpose indicated in the detailed descriptions below.

The take-off shaft 121 transmits rotary motion from the gear train within the housing 64 to a variable ratio speed changing device 122 in turn connected by a shaft 123 to the transmitter T1 of a selsyn system described further below in connection with the showing in Fig. 5. The sensing means assembly 124 interposed between the transmitter T1 and the speed changing mechanism 122 includes the rotatable cam element 125, fixedly secured to the shaft 123 for rotation therewith, and means for supporting the sensing means S3 and S5 adjacent the cam element 125 so that they may be actuated thereby. It should be understood that the position of the cam element in relation to the shaft 123 and the position of the respective sensing means within the sensing means assembly may be made adjustable as necessary to obtain desired settings or alternate settings of the respective parts. Since such adjustability may be provided by any convenient means these parts are not shown as adjustable in the drawings, in order to simplify the showing therein.

A preferred embodiment of the circuitry providing for remotely controlled automatic operation of the instant invention is shown in Fig. 5, in which the various switches and relay contacts are shown in the position which each assumes when the capsule is in its stowed position adjacent the launching, towing, and retrieving mechanism and retained therein by the latch assemblies 21 and 31 locked in their closed positions. The general nature of the various components of the control circuit shown schematically in Fig. 5 is suggested by the use of various suitable schematic representations and suitable reference symbols therefor. The exact nature of the various components of the control circuit and the relationship between these components will be described in detail below in the course of the description of the operation of the present invention.

The operation of the instant invention can best be fully understood by referring primarily to Fig. 5 and as necessary to the showings in Figs. 1, 2, 4 and 6. Since the showing in Fig. 5 represents conditions as they exist immediately prior to the launching or unreeling operation, the following description will commence with the initiation of this operation.

First, the gang switch assembly, including the three-position toggle switches, S11, S12, and S13, is thrown manually by the operator to the position in which the "unreel" circuit is energized, that is, to the left as shown in Fig. 5. Switches S3 and S6, mechanically actuated limit switches whose functions will be described later, are both disposed initially in the closed position as shown in Fig. 5, hence closing elements S11 and S12 of the gang switch assembly energizes the coils L1, L2, L3, and L4 and also illuminates the pilot light PL1. L1 represents the shunt field winding of the rotary actuator motor assembly 62, the solenoid L2 is operative upon energization to simultaneously release the brake and engage the clutch within the housing 64 to couple the actuating motor assembly 62 to the remainder of the winch mechanism 51, the coil L3 of the solenoid assembly 91 is effective upon energization to overpower the biasing spring 92 to release the lock 83 so that the latch assembly 21 may move out of its locked position in order to permit launching the capsule 12, the relay coil L4 is operative upon energization to throw the back to back relay contacts K41 and K42, and pilot light PL1 is lighted to indicate that power is being supplied to the actuating motor assembly 62. Initial displacement of the gang switch assembly having also moved switch S13 to the left as shown in Fig. 5, the relay coil L5 is energized to close relay contact K5, effective when closed to by-pass the speed control resistor R5. Since the contact K41 has been moved to its closed position by energization of the coil L4, the armature circuit is closed while the simultaneous movement of the contact K42 to an open position removes the dynamic braking resistor R4 from the motor armature circuit. Upon the simultaneous occurrence of the various operations noted above the armature M1 starts rotating in the direction necessary to unreel the towing cable from the drum 52 shown in Figs. 1 and 2. As the cable 41 is unreeled, the biasing springs 27 become effective to rotate latch assembly 21 clockwise as shown in Fig. 1 from its fully closed position toward its open position indicated in Fig. 1 by a representation of lever arm 23 in solid lines. With the latch assembly 21 locked in its closed position the switch S2 is maintained in its open position as shown in Fig. 5 by engagement with the bar 26 of the latch assembly, but as the latch assembly 21 is moved out of its closed position, the switch S2 closes so that the pilot light PL2 connected in series with the switch is lighted to indicate that the latch is unlocked. During the clockwise movement of the lever arms 23, the control links 29 are effective to produce clockwise movement of the arms 33 of the latch assembly 31 from the closed position shown in dotted lines in Fig. 1 and designated by the reference numeral 33' to the extreme open position shown in dashed lines in Fig. 1, followed by counterclockwise movement to return the arms 33 to the retracted position shown in solid lines in Fig. 1. The launching operation continues with further unreeling of the cable 41 until a pre-set cable length has been unreeled. The desired cable length is preset by adjustment of the variable ratio speed changing device 122. With the relationship shown in Figs. 1 and 2 between the speed changing device 122 and the sensing means assembly 124 shown in detail in Fig. 6, the normally closed switch S3 is opened by the cam element 125 when the full predetermined length of cable has been unreeled. The opening of switch S3 cuts off power to the shunt field coil L1 of the actuating motor assembly 62 and hence ends the unreeling operation.

The launching operation described above is followed by a towing operation during which the capsule 12 is towed by the aircraft at the end of the predetermined length of towing cable for most effective operation of the equipment installed within the capsule. Since the equipment customarily installed in such capsules generally requires a plurality of electrical circuits interconnecting this equipment with other equipment within the aircraft itself the towing cable 41 generally comprises a plurality of insulated electrical conduits through which the equipment within the capsule is continuously connected to the related equipment within the aircraft by means of an arrangement shown schematically in Fig. 5, including a plurality of slip-rings 151 mounted for rotation with the winch assembly and a plurality of fixed contacts 153 in continuous engagement with said slip rings and connected through the junction box 155 shown in Fig. 1 to equipment within the aircraft.

When the towing operation is completed, the retrieving or reeling operation is initiated by the operator by placing the gang switch assembly in the "reel" position, that is, by moving it to the right as shown in Fig. 5 to energize the "reel" circuit. Upon completion of the simultaneous movement of switch elements S11 and S12 to the right, the coils L1, L2, L3, L4, and the pilot light PL1 are once more energized since the limit switch S4 is in the closed position at the beginning of the reeling operation. It should be noted that the direction of current flow through the coils L1 to L4 and through pilot light PL1 is now reversed as compared to the direction of flow during the unreeling operation. However, the characteristics of these various components are such that this reversal in the direction of current flow is significant only with respect to the coil L1 wherein a reversal of current flow produces rotation of the armature in the opposite direction. The coil L2 may be arranged to be equally effective upon excitation by current flowing in either direction to release the brake and simultaneously engage the impact clutch to connect the actuator motor assembly 62 to the remainder of the winch mechanism. Since the latch 83 is released at the beginning of the unreeling operation and remains released until the end of the reeling operation the reverse current flow through coil L3 at the beginning of the reeling operation is not significant and has no effect on the reeling operation. The relay including the coil L4 must be arranged to be equally effective upon energization in either direction to throw the contacts K41 and K42. The pilot light PL1 is once again lighted as an indication that power is being supplied to the actuating motor assembly 62. Since the limit switch S5 is closed at the beginning of the reeling operation, the initial movement of the gang switch assembly to the right as shown in Fig. 5 also energizes the coil L5 of the speed control relay which is effective when energized to close the contact K5 and thus short out the speed control resistor R5. Under the conditions established in the circuit shown schematically in Fig. 5 by the simultaneous operations described immediately above, the actuator motor assembly 62 continues to rotate the drum 52 of the winch assembly to wind in the towing cable 41 at a relatively high speed, for example, at approximately 50 feet per minute. Since excessive impact loads upon the equipment installed within the capsule must be avoided in order to eliminate damage to this delicate equipment, it is not advisable to complete the reeling or retrieving operation at relatively high speeds which would result in excessive impact loads when the attachment means 16 and 17 of the capsule 12 are brought into engagement with the respective latch assemblies of the launching, towing, and retrieving mechanism at the end of the reeling operation. Therefore, it is necessary to provide means for slowing the rate at which the towing cable is reeled in as the capsule closely approaches the housing 14. Such a means may conveniently be provided by the normally closed limit switch S5 so disposed adjacent to the cam element 125 that it is closed during most of the reeling operation and opened by the cam element 125 when a predetermined large proportion of the preset length of cable has been rewound upon the reel 51. When the switch S5 is opened by engagement with the shoulder portion 126 of the cam element 125, the coil L5 is deenergized so that the contact K5 will return to its open position to place the speed control resistor R5 in series with the armature M1 of the actuator motor assembly 62 for the remainder of the reeling operation. With the speed control resistor R5 in the armature circuit, the current flow therethrough is reduced with the result that the motor speed is reduced substantially, and preferably to about a third of its normal speed. Thereafter, the retrieving or reeling operation is continued at this reduced speed until the attachment means 16 of the towed bird 12 is brought into engagement with the longitudinal rails 18 and thence with the camming surfaces 25 and lever arms 23 of the latch assembly 21. Further reeling of the towing cable 41 overpowers the biasing springs 27 to move the latch assembly 21 toward its locked position represented in Fig. 1 by a dotted outline and identified therein by reference numeral 23'. During this counterclockwise movement of the lever arms 23, the control links 29 are moved from the position shown in solid lines in Fig. 1 to the position shown in dotted lines in Fig. 1 and identified therein by the numeral 29' and in turn these control links move the arms 33 of latch assembly 31 from the retracted position shown in solid lines in Fig. 1 through the extreme position shown in dashed lines to the closed position shown in dotted lines in Fig. 1 and identified by reference numeral 33'. As the latch assembly is placed in its fully closed position, the lock 83 is rotated counterclockwise into the position shown in dotted lines in Fig. 4 and identified therein by the reference numeral 83' in which it is retained by the arm of the bell crank lever 86 that acts as a catch. At the same time, the locking bar 26 of the latch assembly 21 moves the limit switch S2 to its open position as shown in Fig. 5 deenergizing pilot light PL2 as an indication that the latch assembly 21 is once more secured in its fully locked position. Meanwhile, the reeling operation continues to the extent that the actuating motor remains energized and continues to wind the towing cable upon the drum 52. However, with the capsule 12 immobilized in its stowed position in engagement with the housing 14, this continued rotation of the drum 52 increases the tension of the towing cable 41 which in turn exerts a pull upon the supporting pulley wheel 72 effective to overpower the biasing spring 103 of the sheave 102 until the shaft 74 engages and opens the normally closed limit switch S4 to place it in the position shown in Fig. 5, in which the power to the shunt field winding L1 is cut off to terminate the reeling operation.

The schematic electrical circuit as shown in Fig. 5 also includes several components which are automatically operable under certain conditions and function as safety features to insure successful operation of the present invention. One such component is the limit switch S6, mounted upon the support 101 in the manner illustrated in Fig. 4 and normally maintained in a closed position as shown in Fig. 5. During normal unreeling operations the actuator motor assembly 62 rotates the drum 52 to pay out the towing cable 41 which is normally subjected to a considerable tension load due to the weight of the capsule attached thereto and to the aerodynamic loads thereon. Since the towing cable 41 passes over the supporting pulley wheel 72 in the manner indicated in Figs. 1 and 4, the tension loads exerted on the towing cable oppose and partially counteract the biasing effect of spring 103 upon the slidably mounted sheave 102 with the result that the shaft 74 of the supporting pulley wheel 72 is normally located midway of the slot 105 so that it is out of engagement with the normally closed limit switch S6. However, in the event that the towing cable is broken during the unreeling operation, the tension normally imposed upon the towing cable is eliminated with the result that the spring-loaded sheave 102 will then be biased to the left as shown in Fig. 4 until the shaft 74 supported thereby engages and opens the switch S6 in the manner illustrated in Fig. 4 to cut off the power to the actuating motor circuit. With this arrangement, further unreeling of the towing cable is prevented to avoid snarling loose cable within the launching, towing, and retrieving mechanism in the event that loss of tension is due to loss of the capsule attached to the end of the cable. On the other hand, in the event that the loss of tension is transitory, restoration of the tension loading upon the cable will cause the shaft 74 to move out of engagement with the switch S6 so that the switch will close and thereby restore the "unreel" circuit.

Another such component is the dynamic braking resistor R4 connected as shown in Fig. 5 in series with the contact K42. In the event that the drag on the capsule increases substantially beyond the normal amount during the unreeling operation, the increased load imposed thereby upon the towing cable 41 will tend to unreel the cable faster than the motor driven drum 52 would normally play cable out, with the result that the motor will then be driven by the drum through the belt 67. Under these conditions, the actuator motor assembly 62 will act as a generator with a resultant reversal of current in the motor armature circuit. This reversal of current flow through the coil L61 of the differential relay assembly including coils L61 and L62 will modify the collective effect of these two coils so that normally closed contact K6 will be opened. Upon the opening of the contact K6, the relay coil L4 will be deenergized with the result that the contacts K41 and K2 will be returned to the positions shown in Fig. 5. The opening of the contact K41 disrupts the normal armature circuit while the simultaneous closing of the contact K42 places the dynamic braking resistor R4 in series with the armature M1 of the actuator motor assembly. The added resistance introduced by resistor R4 applies a braking torque to the armature which is proportional to the speed of rotation of the armature. Thus, the braking torque applied varies directly in response to the speed with a resultant tendency to maintain a constant speed of unreeling. In the event that the excessive speed of unreeling is due to a transient condition which is sbusequently relieved, the continuing energization of the coil L62 is effective when no longer opposed by a critical reverse current flow through coil L61 to again close the contact K6 with the result that the relay coil L4 is once more energized. Upon reenergization of the coil L4, the back to back relay contacts K41 and K42 are once more thrown to positions in which contact K41 is closed and contact K42 is open, so that power is again supplied to the armature M1 of the actuator motor assembly 62 and normal operation is resumed.

The indicator $I_1$ of the selsyn system, composed of transmitter $T_1$, indicator $I_1$, and their associated stationary windings $L_8$ and $L_9$, connected as shown in Fig. 5, is located adjacent the operator so that the operator may be provided with a continuous indication of the amount of towing cable unreeled at any given time. It is for the purpose of obtaining such information that the transmitter $T_1$ of the selsyn system is connected to the actuator motor assembly in the manner described above. Additional indicating means located adjacent the operator include the pilot lights, $PL_1$ and $PL_2$, each of which has a function already described above in the portion of the specification relating to the operation of the present invention.

A radio interference filter for the actuator motor assembly 62 may be provided by the inclusion of the coil $L_7$ and the capacitance $C_1$ arranged as shown in Fig. 5.

The inclusion of all of the mechanical elements of the preesnt invention within the unitary housing 14 facilitates installation of this equipment upon an aircraft, because it may be adapted readily for attachment to a conventional bomb shackle installation with the added advantage that both the launching, towing, and retrieving mechanism and the capsule attached thereto may readily be jettisoned in an emergency by simply depressing a conventional bomb release control button within the aircraft to which it is attached. All electrical connections to equipment within the aircraft including those leading to the equipment within the capsule may be routed through a breakaway electrical plug type coupling which is automatically uncoupled as the jettisoned equipment including the launching, towing, and retrieving mechanism and the capsule fall away from the aircraft upon release of the bomb shackle.

Thus, the present invention provides a compact auxiliary installation for quick attachment to and release from a towing aircraft which is arranged to support a nose-towed capsule securely in a stowed position and also in its operative position at the end of a length of towing cable, and automatically operable to make the transition between these two extreme positions under the control of a single operator.

Obviously, many modifications and variations of the present invention are possible in the light of the above teachings. It is therefore to be understood that within the scope of the appended claims the invention may be practiced otherwise than as specifically described.

What is claimed is:

1. A compact quick releasable automatic launching, towing and retrieving mechanism for a nose-towed aeroform capsule, said mechanism including a towing cable for attachment to a capsule, cable supporting means for continuously supporting the towing cable, remotely controlled automatically operable means for unreeling and reeling the towing cable to launch and retrieve a capsule attached thereto, a plurality of coordinated automatically operable latch means at least one of which is normally disposed in an open position and all of which are arranged to be moved automatically into a closed position by engagement with a capsule as the towing cable is reeled in, and remotely controlled automatically operable locking means for releasably retaining the latch means in their closed positions to fixedly secure a capsule engaged thereby.

2. An airborne automatic launching, towing, and retrieving mechanism for a nose-towed aeroform capsule, said mechanism comprising an elongated supporting frame, a remotely controlled automatically retractable towing cable extending rearwardly from the forward end of said frame and connected at its end to the forward end of a towed capsule, first and second longitudinally spaced latch assemblies mounted upon the lower side of said frame, said latch assemblies being operatively interconnected for coordinated sequential operation in a predetermined manner, a biasing means connected to said supporting frame and arranged to bias the forwardly located first latch assembly toward its opened position, and locking means for retaining said first latch assembly in its closed position, whereby suitable longitudinally spaced fittings on the upper side of a towed capsule are automatically brought into engagement with said latch assemblies as said towing cable is retracted and said latch assemblies are automatically moved to and locked in their closed positions by further retraction of said towing cable.

3. A device as described in claim 2 wherein the first latch assembly comprises a pair of laterally spaced elongated lever arms extending radially in angular alignment from a common rotatable mounting means disposed transversely of the elongated supporting frame for simultaneous rotation between two extreme positions, namely a forwardly disposed closed position and a rearwardly disposed open position, a transversely extending elongated locking bar fixedly secured to and rigidly interconnecting the ends of the respective lever arms remote from the rotatable mounting means therefor, a projection fixedly secured to each of said lever arms projecting radially outward from the rotatable mounting means and spaced laterally from the lever arm to form a radially inwardly extending notch between said projection and an intermediate portion of said lever arm, and a pair of arcuate camming slots similarly disposed in relation to the transversely extending rotatable mounting means and each located adjacent one of said lever arms, said arcuate camming slots being initially effective to guide a transversely extending attachment means mounted upon the forward end of a capsule into engagement with portions of the respective lever arms disposed radially outward of the respective projections thereon and subsequently effective as the respective lever arms are rotated from their open position to their closed position to bias said attachment means radially inward into the notches defined by the respective projections whereby said attachment means is fully restrained by the first latch assembly when it reaches its forwardly disposed fully closed position.

4. A device as described in claim 3 wherein said second latch assembly comprises a pair of elongated arms each rotatably secured at one end to a pivotal supporting means, said supporting means being disposed in spaced relation upon an axis of rotation extending transversely of said elongated supporting frame, a first pair of supporting links each pivotally connected at one end to a point intermediate the ends of one of said arms, a second pair of elongated supporting links pivotally connected at one end to the other end of the respective first supporting links and pivotally connected at the other end to supporting pivots each fixedly secured to said elongated supporting frame and disposed in spaced relation upon another axis of rotation extending transversely of said elongated supporting frame, said first and second pairs of supporting links being arranged to rotate said arms in one direction from a retracted position to an extreme open position and thence in the opposite direction to a closed position and return, and a pair of elongated control links together comprising the means interconnecting the first and second latch assemblies each connected at one end to the pivotal interconnection between one of the first supporting links and one of the second supporting links and pivotally connected at its opposite end to the locking bar interconnecting the lever arms of said first latch assembly, whereby the rotary movement of said second latch assembly is continuously coordinated with the rotary movement of said first latch assembly.

5. A device as described in claim 4, wherein said locking means is supported by said elongated supporting frame and disposed adjacent the closed position of said first latch assembly, said locking means being operable as said first latch assembly is moved into its closed position to engage and lock said first latch assembly in its closed position and effective through said control links to retain said second latch assembly in its closed position, whereby a towed capsule, the respective attachment means of which are engaged in said latch assemblies is securely maintained in its stowed position adjacent to and in fixed relation to said elongated supporting frame until the locking means is released.

6. A device as described in claim 5, wherein said latch assembly locking means comprises a supporting member, a generally U-shaped lock, a pivotal support secured to said supporting member upon which the U-shaped lock is rotatably mounted, a lock biasing means connected to said supporting member and arranged to continuously bias said lock into its open position, a catch rotatably mounted upon said supporting member adjacent said lock, catch biasing means continuously biasing said catch into engagement with said lock, said catch being arranged to retain said lock in its closed position whenever said lock is moved into its locked position, and remotely controlled release means mounted upon said supporting member and arranged to overpower said catch biasing means to rotate said catch out of engagement with said lock in order to release said lock from its closed position.

7. An airborne automatic launching, towing, and retrieving mechanism for a nose-towed aeroform capsule, said mechanism comprising an elongated supporting frame, a winch and drive means therefor mounted within said supporting frame, a pulley wheel mounted at the forward end of the supporting frame for rotation about a transverse horizontal axis, a towing cable connected at one end to and wound upon said winch, threaded over said pulley wheel and out through the lower side of the elongated frame, and connected at the other end to a capsule adjacent the forward end thereof, a first latch assembly rotatably mounted adjacent the forward end of the lower side of said supporting frame for rotation about a transverse horizontal axis, a second latch assembly rotatably mounted adjacent the rearward end of the lower side of said supporting frame for rotation about a transverse horizontal axis, a linkage means interconnecting said first and second latch assemblies to coordinate their operation so that the second latch assembly both opens and closes while said first latch assembly moves in either direction between its open and closed positions, a biasing means mounted upon said supporting frame and arranged to bias said first latch assembly toward its open position, and remotely controlled releasable locking means arranged to retain said first latch assembly in its closed position, whereby said latch assemblies may be engaged sequentially with suitable longitudinally spaced attachment means mounted upon a towed capsule and then be locked in their closed positions to secure such a capsule in fixed relation to the elongated supporting frame.

8. A device as described in claim 7 wherein the first latch assembly comprises a pair of laterally spaced elongated lever arms extending radially in angular alignment from a common rotatable mounting means disposed transversely of the elongated supporting frame for simultaneous rotation between two extreme positions, namely a forwardly disposed closed position and a rearwardly disposed open position, a transversely extending elongated locking bar fixedly secured to and rigidly interconnecting the ends of the respective lever arms remote from the rotatable mounting means therefor, a projection fixedly secured to each of said lever arms projecting radially outward from the rotatable mounting means and spaced laterally from the lever arm to form a radially inwardly extending notch between said projection and an intermediate portion of said lever arm, and a pair of arcuate camming slots similarly disposed in relation to the transversely extending rotatable mounting means and each located adjacent to one of said lever arms, said arcuate camming slots being initially effective to guide a transversely extending attachment means mounted upon the forward end of a capsule into engagement with portions of the respective lever arms disposed radially outward of the respective projections thereon and subsequently effective as the respective lever arms are rotated from their open position to their closed position to bias said attachment means radially inward into the notches defined by the respective projections whereby said attachment means is fully restrained by the first latch assembly when it reaches its forwardly disposed fully closed position.

9. A device as described in claim 8 wherein said second latch assembly comprises a pair of elongated arms each rotatably secured at one end to a pivotal supporting means, said supporting means being disposed in spaced relation upon an axis of rotation extending transversely of said elongated supporting frame, a first pair of supporting links each pivotally connected at one end to a point intermediate the ends of one of said arms, a second pair of elongated supporting links pivotally connected at one end to the other end of the respective first supporting links and pivotally connected at the other end to supporting pivots each fixedly secured to said elongated supporting frame and disposed in spaced relation upon another axis of rotation extending transversely of said elongated supporting frame, said first and second pairs of supporting links being arranged to rotate said arms in one direction from a retracted position to an extreme open position and thence in the opposite direction to a closed position and return, and a pair of elongated control links together comprising the means interconnecting the first and second latch assemblies each connected at one end to the pivotal interconnection between one of the first supporting links and one of the second supporting links and pivotally connected at its opposite end to the locking bar interconnecting the lever arms of said first latch assembly, whereby the rotary movement of said second latch assembly is continuously coordinated with the rotary movement of said first latch assembly.

10. A device as described in claim 9, wherein said locking means is supported by said elongated supporting frame and disposed adjacent the closed position of said first latch assembly, said locking means being operable as said first latch assembly is moved into its closed position to engage and lock said first latch assembly in its closed position and effective through said control links to retain said second latch assembly in its closed position, whereby a towed capsule, the respective attachment means of which are engaged in said latch assemblies is securely maintained in its stowed position adjacent to and in fixed relation to said elongated supporting frame until the locking means is released.

11. A device as described in claim 10, wherein said latch assembly locking means comprises a supporting member, a generally U-shaped lock, a pivotal support secured to said supporting member upon which the U-shaped lock is rotatably mounted, a lock biasing means connected to said supporting member and arranged to continuously bias said lock into its open position, a catch rotatably mounted upon said supporting member adjacent said lock, catch biasing means continuously biasing said catch into engagement with said lock, said catch being arranged to retain said lock in its closed position whenever said lock is moved into its locked position, and remotely controlled release means mounted upon said supporting member and arranged to overpower said catch biasing means to rotate said catch out of engagement with said lock in order to release said lock from its closed position.

12. A device as described in claim 7, wherein said pulley wheel is rotatably supported upon a transversely extending shaft supported by a sheave, an elongated sheave support fixedly secured to said elongated supporting frame, means for slidably supporting said sheave for movement longitudinally of said sheave support between two spaced extreme positions therefor, sheave biasing means attached to said sheave support, and arranged to continuously bias said sheave in one direction, and a pair of sensing means attached to said sheave support and disposed adjacent the respective extreme positions of said sheave to sense movement of said sheave into these positions, said sheave biasing means being arranged to oppose the tendency to displace said pulley wheel and the sheave upon which it is rotatably mounted due to the normal tension loads upon the towing cable passed over said pulley wheel, whereby the sliding sheave and the pulley wheel supported thereby are normally positioned midway of the extreme positions of said sheave during reeling and unreeling operations due to the opposed forces exerted by tension in the towing cable and by the sheave biasing means.

13. A launching, towing, and retrieving mechanism for an elongated airborne capsule having a longitudinally spaced plurality of fixed attachment means comprising a length of towing cable to one end of which a capsule may be attached, adjustable supporting means for selectively supporting said towing cable either in a stowed position or in an extended condition, said supporting means including longitudinally spaced engaging means for engagement with the respective attachment means on said capsule, a rotatable reeling element for storing said towing cable and reversible automatically operable drive means operatively connected to said reeling element, retaining means automatically operable upon engagement with at least one of the attachment means of a capsule for securing a capsule in an immobilized stowed position in fixed engagement with said mechanism, means for releasing said retaining means to which a capsule is attached, means for reeling in the entire length of towing cable, a remotely actuated electrical control system for said launching, towing, and retrieving mechanism including a first circuit which when energized operates the means for releasing said retaining means and energizes said reversible drive means for movement in one sense for unreeling a predetermined length of towing cable, said first circuit being arranged to be automatically deenergized when a predetermined length of towing cable has been unreeled, and a second circuit which when energized energizes said reversible drive means for movement in the opposite sense for reeling in the entire length of towing cable, said second circuit being arranged to be automatically deenergized when the entire length of towing cable has been reeled in and said retaining means has been engaged by a capsule attached to the end of the towing cable, remotely located manually operated means for energizing said first circuit, and remotely located manually operated means for energizing said second circuit.

14. A device as described in claim 13, wherein said mechanism includes, in addition, automatically operable braking means effective to counteract excessive speed of unreeling the towing cable, and wherein the first circuit includes a first sensing means responsive to an excessive rate of unreeling operable to activate said braking means and a second sensing means responsive to subsequent reduction in speed of unreeling operable to deactivate said braking means and restore normal operation of said first circuit.

15. A device as described in claim 13, wherein said second circuit includes reeling speed reducing means effective when activated to substantially reduce the rate at which the towing cable is reeled in and sensing means responsive to the rewinding of a predetermined major portion of the entire unreeled cable length operable to activate said reeling speed reducing means.

16. A device as described in claim 13, wherein said mechanism includes, in addition, automatically operable braking means effective to counteract excessive speed of unreeling the towing cable, said first circuit includes a first sensing means responsive to an excessive rate of unreeling operable to activate said braking means and a second sensing means responsive to a subsequent reduction in speed of unreeling operable to deactivate said braking means and restore normal operation of said first circuit, and said second circuit includes reeling speed reducing means effective when activated to substantially reduce the rate at which the towing cable is reeled in and a third sensing means responsive to the rewinding of a predetermined major portion of the entire unreeled cable length operable to activate said reeling speed reducing means.

17. A compact quick releasable automatic launching, towing and retrieving mechanism for a nose-towed elongated aeroform capsule having a longitudinally spaced plurality of fixed attachment means, said mechanism including a towing cable for attachment to a capsule, capsule supporting means including longitudinally spaced engaging means for engagement with the respective attachment means of a capsule, a cable storage reel for continuously supporting the towing cable, and remotely controlled automatically operable reversible drive means operatively connected to said reel for unreeling and reeling the towing cable to launch and retrieve a capsule attached thereto, a plurality of coordinated automatically operable latch means at least one of which is normally disposed in an open position and all of which are arranged to be moved automatically into a closed position by engagement with a capsule as the towing cable is reeled in, remotely controlled automatically operable locking means for releasably retaining the latch means in their closed positions to fixedly secure a capsule engaged thereby in an immobilized position in engagement with said mechanism, an automatic remotely actuated electrical control system for said launching, towing, and retrieving mechanism comprising a first circuit which when energized operates said reversible drive means in one direction for unreeling a predetermined length of towing cable and then is automatically deenergized when a predetermined length of towing cable has been unreeled, manually operated means for energizing said first circuit, a second circuit which when energized operates said reversible drive means in the opposite direction to reel in the towing cable and then is automatically deenergized when the entire length of towing cable has been reeled in, and manually operated means for energizing said second circuit.

References Cited in the file of this patent

UNITED STATES PATENTS

| | | |
|---|---|---|
| 2,376,994 | Fenton | May 29, 1945 |
| 2,414,473 | Mahnke | Jan. 21, 1947 |
| 2,443,028 | Edwards | June 8, 1948 |
| 2,590,131 | Schonstedt | Mar. 25, 1952 |

FOREIGN PATENTS

| | | |
|---|---|---|
| 639,020 | Germany | Nov. 27, 1936 |